United States Patent
Maehata

(10) Patent No.: US 6,816,452 B1
(45) Date of Patent: Nov. 9, 2004

(54) VEHICLE-TO-ROADSIDE COMMUNICATION SYSTEM, ROADSIDE COMMUNICATION STATION, AND ON-BOARD MOBILE STATION

(75) Inventor: Takashi Maehata, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 806 days.

(21) Appl. No.: 09/786,955

(22) PCT Filed: Jun. 22, 2000

(86) PCT No.: PCT/JP00/04121

§ 371 (c)(1),
(2), (4) Date: Mar. 12, 2001

(87) PCT Pub. No.: WO01/06689

PCT Pub. Date: Jan. 25, 2001

(30) Foreign Application Priority Data

Jul. 14, 1999 (JP) ............................................. 11-200825

(51) Int. Cl.[7] ................................................ H04J 11/00
(52) U.S. Cl. ...................................... 370/208; 370/203
(58) Field of Search ................................ 370/203, 208, 370/295, 319, 480

(56) References Cited

U.S. PATENT DOCUMENTS 6,392,588 B1 * 5/2002 Levanon ..................... 342/202
6,407,993 B1 * 6/2002 Moulsley .................... 370/347

FOREIGN PATENT DOCUMENTS

| JP | 8-241495 | 9/1996 |
|---|---|---|
| JP | 11-346203 | 12/1999 |
| JP | 3045167 | 3/2000 |
| JP | 2000-134667 | 5/2000 |
| WO | WO00/39944 | 7/2000 |

OTHER PUBLICATIONS

"Repeated Transmission Method using OFDM in MultiCasting Communication Systems", M. Asano et al., Technical Research Report of the Institute of Electronics, Information and Communication Engineers, (Japan), Jan. 21, 1999, vol. 98, No. 537, pp. 9–14.

* cited by examiner

*Primary Examiner*—Wellington Chin
*Assistant Examiner*—Brenda Pham
(74) *Attorney, Agent, or Firm*—McDermott Will & Emery LLP

(57) ABSTRACT

The present invention realizes a communication system between a road and a vehicle which performs communication between a road communication station and a vehicle-mounted mobile station in a cell, utilizing an OFDM modulation method, in which interference between carriers does not occur even when a vehicle runs at high speed and Doppler shift increases, which prevents occurrence of the degradation in communication quality. After detecting the velocity of a vehicle in the cell, the space between frequencies of subcarriers of OFDM is increased as the detected velocity of the vehicle becomes higher. Assuming that an occupied bandwidth of frequency assigned according to the Radio Law is fixed in a radio wave, the number of subcarriers within the occupied bandwidth of 1 frequency is reduced (thinned out). Even when the vehicle runs at high speed, the interference between carriers does not occur, thereby allowing high-quality data communication. Moreover, since the number of vehicles present in the cell is small, a drop in the data transmission rate due to a phenomenon related to the number of subcarriers can be coped with by the present invention.

6 Claims, 8 Drawing Sheets

VEHICLE-TO-ROADSIDE COMMUNICATION SYSTEM, ROADSIDE COMMUNICATION STATION, AND ON-BOARD MOBILE STATION

TECHNICAL FIELD

The present invention relates to a communication system between a road and a vehicle which enables mobile communication between a road and a mobile station by arranging a plurality of road antennas along the road to form a cell on the road. In particular, the present invention relates to a communication system between a road and a vehicle, utilizing an Orthogonal Frequency Division Multiplex (hereinafter, referred to as OFDM) method as a data modulation method.

BACKGROUND ART

There is an increasing demand for communications between road controllers and vehicles. On a superhighway, in particular, to operate a vehicle without any burden on the driver and to prevent accidents both for the controller and the driver, a frequently interchange of information is necessary between the road and the vehicle. One type of such a system has been developed, wherein a self-operating system allows a vehicle to run with close communication between the road and the vehicle, which are equipped with various sensors and a camera (see, for example, Japanese Unexamined Patent Publication No. 241495 of Sep. 17, 1996).

For the construction of a driving support system (hereinafter, referred to as "communication system between a road and a vehicle") which makes use of the communication with the vehicle for future extension into a self-operating system, it is necessary to provide a communication area (cell) on the road.

To provide such a cell, we may consider laying a leakage coaxial cable along the road. However, has the drawback of this method is that large-scale construction is needed for laying such a cable. In addition, since it is required to locate the leakage coaxial cable at a relatively low position on the ground, the space for which a radio wave propagates in a direction across a traffic lane is disadvantageously short.

On the other hand, if the communication is performed with a plurality of road antennas being arranged on the road at predetermined intervals, a single road antenna can cover a relatively large cell. In this case, each of the road antennas is connected to a central base station of the road controller via an optical fiber and the like.

In the case where the road antennas are provided, when a large-size vehicle comes proximate to a small-size vehicle, it obstructs the view of the driver of the small-size vehicle preventing visual detection of the road antenna from inside the vehicle. In particular, a microwave or a millimeter wave of a high frequency having a small angle of diffraction is blocked. Accordingly, the communication between the vehicle and the road is interrupted, thereby preventing continued communications. Therefore, in order to enable continuous communication between the road and the vehicle, multi-station communication has been proposed. According to this multi-station communication, a plurality of road antennas having an inherent directivity are provided along the road, and radio waves of the same frequency and the same content are emitted from the respective road antennas toward the same cell.

A multi-station communication system is advantageous because such a system has a plurality of propagation paths for radio waves to be emitted and therefore the radio wave avoids being blocked so as to continuously perform smooth communication between a mobile station and a road communication station even when a vehicle runs proximate to a large-size vehicle such as a truck.

In the case of multi-station communication, however, since a plurality of radio waves are emitted by a similar transmission power into the same cell, which causes fading due to multipath, resulting in intense intercarrier interference or intersymbol interference. Consequently, it is essential to remove the effects of such interference for construction of the system.

Generally, a mobile object communication system using a single carrier is likely to be subjected to the effects of intersymbol interference by a multipath delayed wave.

Accordingly, the use of an OFDM modulation method that allows transmission of a plurality of subcarriers obtained by dividing a carrier has been proposed. The OFDM modulation method is advantageous in that the effects of a delayed wave can be eliminated by setting guard time.

Since a carrier is transmitted after being divided into a plurality of subcarriers in the OFDM modulation method, the space between the frequencies of subcarriers is relatively small.

In a mobile communication method, however, when a vehicle is operating, the Doppler effect occurs with the movement of the vehicle. Therefore, in the OFDM modulation method, interference between subcarriers occurs, which leads to the degradation of communication quality.

Accordingly, it is necessary to set the space between the frequencies of subcarriers to be a sufficiently great value (30 to 100 times or more) with respect to the maximum Doppler frequency defined by the assumed running speed of a vehicle.

However, the occupied bandwidth of frequency assigned according to the Radio Law is fixed in a radio wave, and the number of subcarriers is limited when a space between the frequencies of subcarriers is enlarged, thereby adversely reducing the communication capacity.

Particularly, in the case where a large number of vehicles enter a cell, there arises the problem of a reduction of the transmission rate assigned to each vehicle, which prevents high quality data communication.

The inventor of the present invention assumes that the Doppler shift is small when a large number of vehicles enter the cell because there is traffic congestion or a similar condition. Therefore, the inventor also detects that the relationship between the number of subcarriers, if present, and the average running speed of vehicles in the cell can be established.

In the communication system between a road and a vehicle performing communication between a road communication station and a vehicle-mounted mobile station in the cell, utilizing an OFDM modulation method, the object of the present invention is to achieve a communication system between a road and a vehicle, a road communication station and a vehicle-mounted mobile station, in which the interference between carriers does not occur even when a vehicle runs at high speed and the amount of data transmission is ensured even when the vehicle runs at low speed, thereby preventing the degradation of communication quality.

DISCLOSURE OF INVENTION (1) A communication system between a road and a vehicle recited in claim 1 in order to achieve the above object detects the velocity of a vehicle in a cell and enlarges the space between the frequencies of subcarriers of OFDM as the detected velocity of the vehicle becomes higher. Therefore, interference between subcarriers can be avoided by enlarging the space between the frequencies of subcarriers as the Doppler shift increases with the increase of the velocity of the vehicle in the cell in the present invention.

The phrase "enlarging the space between the frequencies of subcarriers" means that the number of subcarriers is reduced (thinned out) in the occupied bandwidth of frequency on the assumption that the occupied bandwidth of the frequency assigned according to the Radio Law is fixed in the radio wave.

Accordingly, although data transmission rate inevitably drops, it is assumed from the fact that the velocity of the vehicle in the cell is high and that a small number of vehicles are present in the cell. Since it is also assumed that the total data transmission capacity of all vehicles is small as well, it does not cause any problem.

If the velocity of a vehicle in the cell is low, the space between the frequencies of subcarriers of OFDM is left as it is without being enlarged.

Since the Doppler shift is small if the velocity of the vehicle in the cell is small, it is unlikely that interference between subcarriers will occur even when the space between the frequencies of subcarriers is not enlarged. Moreover, in the case where the velocity of the vehicle in the cell is low, the occurrence of traffic congestion or a similar condition is presumed, the number of vehicles present in the cell is large, and the total data transmission capacity of all vehicles is correspondingly large. Accordingly, since it is preferable that the data transmission rate be high, a small space between the frequencies of subcarriers is advantageous at this point.

BRIEF DESCRIPTION OF THE DRAWINGS

FIG. 2 is a block diagram showing the internal configuration of a transmitting station 2b and a receiving station 2a.

BEST MODE FOR CARRYING OUT THE INVENTION

Figure 1:
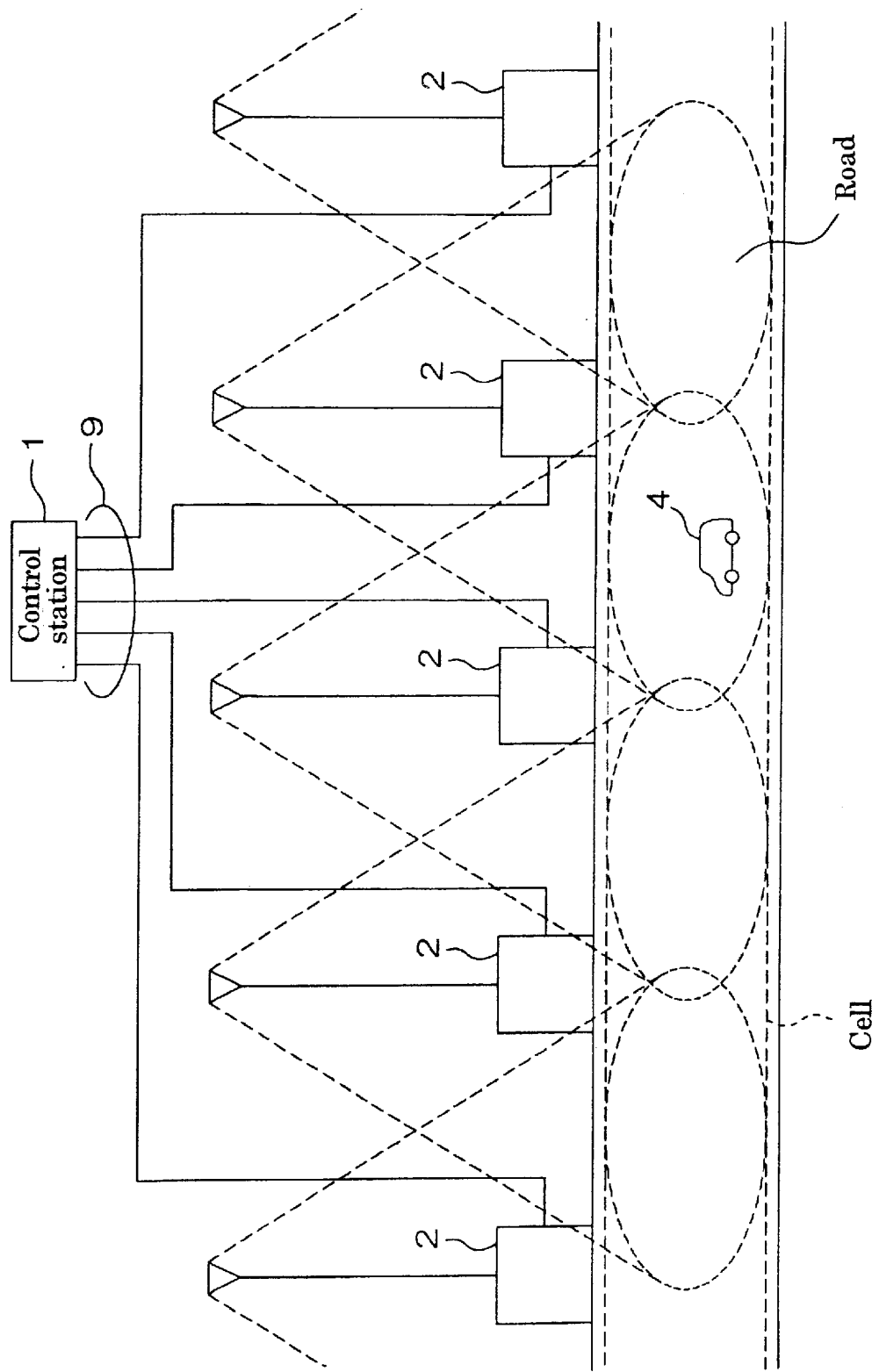
FIG. 1 is a conceptual view showing the configuration of a communication system between a road and a vehicle according to the present invention.

As described above, according to a communication system between a road and a vehicle of the present invention, a communication system between a road and a vehicle can be achieved, in which interference between carriers does not occur even when a vehicle runs at high speed and data transmission is ensured even when the vehicle runs at low speed to allow high-quality data communication in both cases.

If a plurality of vehicles exist in the cell, the velocity of the vehicle in the cell varies for each vehicle. In such a case, it is desirable to use the average velocity of the vehicles (claim 2).

(2) A road communication station according to the present invention comprises a transmitting station, a receiving station, and a control station, wherein the control station includes: a carrier arrangement determination means for determining a subcarrier arrangement so as to enlarge the space between the frequencies of subcarriers of the OFDM as the detected velocity of the vehicle increases, based on data of the detected velocity of the vehicle in the cell; a data assignment means for assigning data to be transmitted based on the subcarrier arrangement determined by the carrier arrangement determination means; and a data selection means for selecting the received data based on the subcarrier arrangement (claim 3).

With this road communication station, Doppler shift increases with increase of the velocity of the vehicle in the cell. Accordingly, by enlarging the space between the frequencies of subcarriers, the interference between carriers can be avoided.

The phrase "assigning data" means that data mapping is performed only for the subcarriers determined by the carrier arrangement determination means and that the data is not allocated to a null subcarrier.

The phrase "selecting the received data" means that only the data imposed on the effective subcarriers is fetched.

It is preferred that information of the sub carrier arrangement determined by the carrier arrangement determination means is transmitted to a vehicle-mounted mobile station of the vehicle in the cell by using a control channel (claim 4).

In this way, the vehicle in the cell is informed of the subcarrier arrangement so as to receive data based on this subcarrier arrangement. Moreover, this transmission of data allows the carrier arrangements to be unified for all vehicles so as to avoid the collision of data in the case where a plurality of vehicles is present in the cell.

Since the amount of Doppler shift occurring when the road communication station receives the data (upward processing) is similar to that occurring when the road communication station transmits the data (downward processing), it is preferable to use the same carrier arrangement in the upward processing and in the downward processing.

Various means may be used for detecting the velocity of a vehicle in the cell. For example, a velocity signal is transmitted from each vehicle to the road communication station, an ultrasonic speed sensor is provided on the road, a television camera is provided on the road, and the like.

As recited in claim 5, however, a means of detecting a shift in the received frequency based on the Doppler shift from the vehicle in the cell can also be used. According to this method, since the shift in the received frequency is consistently detected by AFC (Automatic Frequency Control), it is not required to additionally provide a new means for detecting the velocity of a vehicle, thereby allowing the reduction of cost.

(3) A vehicle-mounted mobile station according to the present invention comprises: a subcarrier arrangement information receiving means for receiving the information of a subcarrier arrangement from a road communication system, which is determined so as to enlarge the space between the frequencies of subcarriers of the OFDM as the velocity of a vehicle increases, based on data of the velocity of the vehicle in the cell; a data assignment means for assigning data to be transmitted based on the received information of the subcarrier arrangement; and a data selection means for selecting the received data based on the information of the subcarrier arrangement (claim 6).

According to this vehicle-mounted mobile station, the Doppler shift increases as the velocity of the vehicle in the cell increases. Thus, by enlarging the space between the frequencies of subcarriers, the interference between carriers can be avoided.

(Embodiment 1)

Hereinafter, a preferred embodiment of the present invention will be described in detail with reference to the attached drawings.

FIG. 1 is a conceptual view showing the configuration of a communication system between a road and a vehicle according to the present invention. This communication system between a road and a vehicle transmits and receives road traffic information between a road communication station and a mobile station mounted on a vehicle.

A cell is formed along the road. In the cell, a plurality of transmitting and receiving stations 2, each having an inherent directivity, are arranged at intervals. From the antenna of each transmitting and receiving station 2, a radio wave of the same content and the same frequency (for example, 6(GHz) band) is emitted toward the cell. Therefore, radio waves of the same frequency reach each position in the cell from forward and backward directions or an upward direction with respect to the longitudinal direction of the road.

A height h of the antenna of the transmitting and receiving station 2 from the ground is, for example, 10 (m). A length of the cell in a longitudinal direction of the road is, for example, 100 (m).

The transmitting and receiving station 2 acquires the transmitted data via a wire transmission line 9 such as an optical fiber or a coaxial cable (although a wireless transmission line may be used instead of the wire transmission line, it is hereinafter assumed that the "wire transmission line 9") is used from a control station 1. The transmitted data is then subjected to orthogonal frequency division multiplex modulation (hereinafter referred to as OFDM modulation) using a plurality of carrier waves (subcarriers) orthogonally crossing each other, and is transmitted as a wireless radio wave into the cell. The transmitting and receiving station 2 receives the OFDM modulated wireless radio wave from a vehicle-mounted mobile station 4 in the cell, and then performs OFDM demodulation on this wireless radio wave so as to transmit the received data via the wire transmission line 9 to the control station 1.

In this specification, the combination of the function of the transmitting and receiving station 2 and the function of the control station 1 collectively form the "road communication station".

It is assumed that the frequency of a wireless radio wave transmitted from the transmitting and receiving station 2 into the cell (downward wireless frequency) differs from that of a wireless radio wave transmitted from the vehicle-mounted mobile station toward the transmitting and receiving station 2 (upward wireless frequency). In the case where a time slot for communication is separately provided, however, the upward frequency and the downward frequency may be set to be the same.

Figure 2:
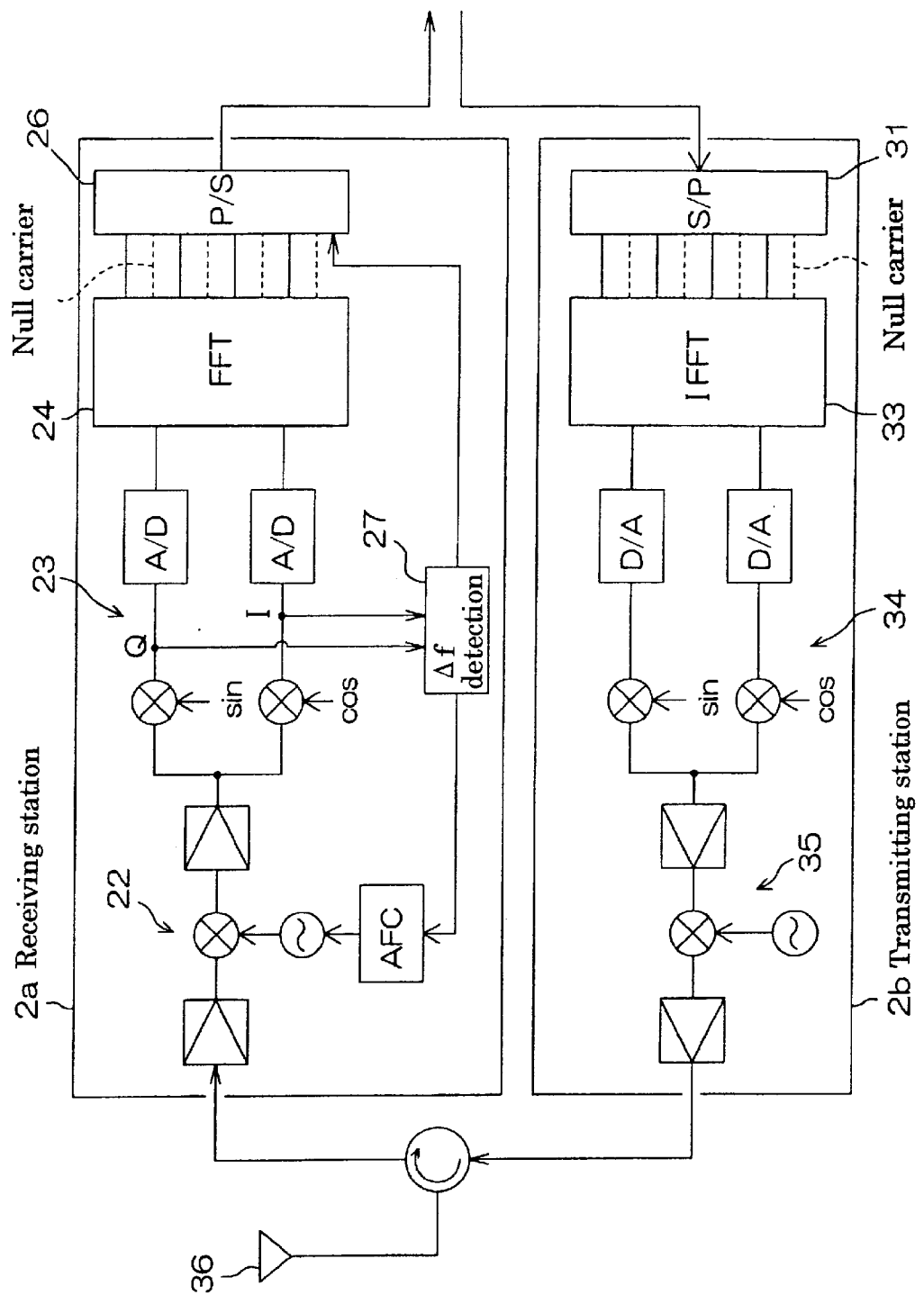

FIG. 2 is a block diagram showing the internal configuration of a transmitting station 2b and a receiving station 2a of the transmitting and receiving station 2.

The transmitting station 2b comprises an S/P (serial/parallel) converting circuit 31, an inverse Fourier transform circuit 33, an orthogonal modulation circuit 34, an up-converter 35 and the like.

The receiving station 2a comprises a down-converter 22, an orthogonal demodulation circuit 23, a Fourier transform circuit 24, a P/S parallel/serial) converting circuit 26, a Δf detecting section 27, and the like.

The inverse Fourier transform circuit 33 of the transmitting station 2b achieves various functions as follows. The inverse Fourier transform circuit 33 performs inverse Fourier transform on the transmitted data supplied in parallel from the S/P converting circuit 31, converts the inverse Fourier transformed data to return it to serial, and time-compresses a serial symbol string so as to move a posterior symbol to the beginning of the string, thereby setting a guard time.

Figure 3:
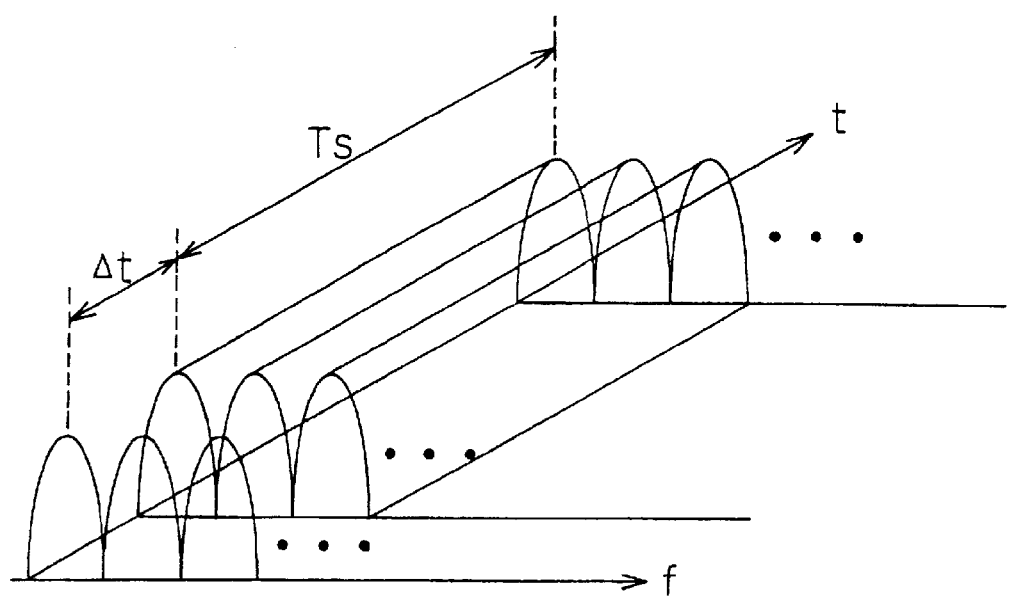
FIG. 3 is a graph showing symbol transmission by OFDM on a frequency axis f and a time axis t.

FIG. 3 is a graph showing the symbol transmission by OFDM on a frequency axis f and a time axis t. An effective symbol length is represented by TS, and a guard time is given by Δt. A time compression ratio is represented by (TS+Δt)/TS. In the case of QPSK, TS is expressed by: TS=2n/m($\mu$sec), where the number of subcarriers is n, and the transmission rate is m (Mbps).

The guard time Δt of the OFDM modulation must be set to be longer than the time delayed by the multipath. In this way, the transmitting and receiving station 2 and the vehicle-mounted mobile station 4 can avoid intersymbol interference so as to accurately restore the received signal without being adversely affected by the propagation delay due to the presence of a plurality of propagation paths for the radio wave (multipath).

With reference to FIG. 2, the orthogonal modulation circuit 34 performs orthogonal modulation by D/A converting an in-phase component and an orthogonal component output from the inverse Fourier transform circuit 33, subjecting these signals respectively to a sin wave (sin ωt) and a cos wave (cos ωt), and adding them.

Needless to say that although QPSK modulation is performed in this embodiment, other modulation methods, for example, QAM, BPSK, 8PSK and the like may be used. In the following description, however, it is assumed that QPSK modulation is performed unless specifically noted.

The up-converter 35 is a circuit for frequency conversion into a wireless frequency. The output signal from the up-converter 35 passes through a circulator and a coaxial cable to be emitted from road antennas 36a and 36b as a radio wave.

The down-converter 22 of the receiving station 2a converts a wireless frequency into an intermediate frequency.

In contrast with the orthogonal modulation circuit 34, the orthogonal demodulation circuit 23 performs orthogonal demodulation; one of two divided signals is subjected to a sin wave while the other divided signal is subjected to a cos wave so as to A/D convert these divided signals.

The frequency difference Δf detecting section 27 detects a deviation Δf of the received frequency based on the in-phase component I (signal after being subjected to a cos wave) and the orthogonal component Q (signal after being subjected to a sin wave) of the orthogonal demodulation circuit 23. The deviation Δf of the received frequency can be obtained based on the difference between a deflection angle $(I/Q)_t$ of a current I/Q and a deflection angle $(I/Q)_t-1$ sampled immediately before I/Q which are obtained by calculating the deflection angle of a complex number I/Q at sampling time intervals.

$$\Delta f = (I/Q)_t - (I/Q)_t - 1$$

The Δf detecting section 27 feeds back the deviation Δf of the received frequency to the down-converter 22, thereby accomplishing the function of correcting the deviation Δf of the received frequency.

The Δf detecting section 27 transmits the data of the detected deviation Δf of a received frequency to the control section 1.

The Fourier transform circuit 24 performs processing that is opposite to that of the inverse Fourier transform circuit 33 on the transmission side. The Fourier transform circuit 24 performs Fourier transform on the orthogonal-demodulated signal with the effective symbol length TS as a window length, thereby obtaining a demodulated signal.

The P/S converting circuit 26 converts a Fourier transformed parallel signal into a serial signal. A parallel signal contains the data of the detected deviation Δf of the received frequency as described above.

This data converted into a serial signal is transmitted to the control station 1, which in turn reconverts the serial data into parallel data and performs the processing as follows.

In the system of the present invention, the processing changes depending on whether all subcarriers are used or whether only some of the subcarriers are used, based on the running speed of a vehicle. In the case where only some of the subcarriers are used, it is necessary to determine on which subcarriers parallel data is to be imposed among a plurality of subcarriers (that is, to determine the arrangement of null carriers to which data is not transmitted) before assigning the parallel data for transmission from the road toward the vehicle. Moreover, it is required to retrieve actual data by selection from the received parallel data (that is, by excluding the data corresponding to the null carriers).

The control station 1 determines the arrangement of subcarriers, assigns parallel data before transmission, and selects the received parallel data described above.

Figure 4:
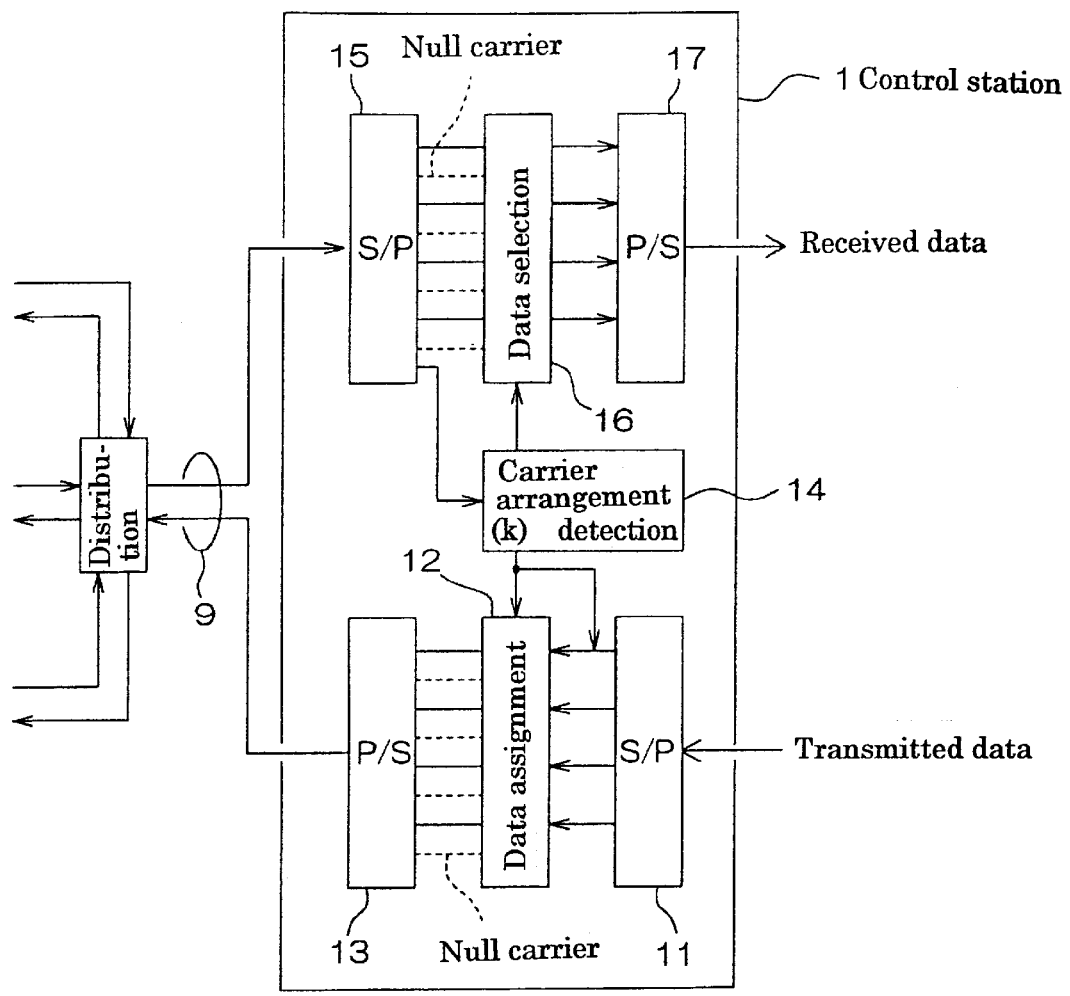
FIG. 4 is a block diagram showing the internal configuration of a control station 1.

FIG. 4 is a block diagram showing the internal configuration of the control station 1.

A carrier arrangement (K) determination circuit 14 determines a carrier arrangement as follows, based on the data of a deviation Δf of the received frequency transmitted from the transmitting and receiving station 2.

In the OFDM, the relationship: ΔF=K·R (K is an integer, and hereinafter is referred to as "carrier arrangement K") must be established, where a transmission rate per subcarrier is R (kbps), and the space between the frequencies of subcarriers is ΔF. In the normal OFDM, the carrier arrangement is given as: K=1.

Figure 5:
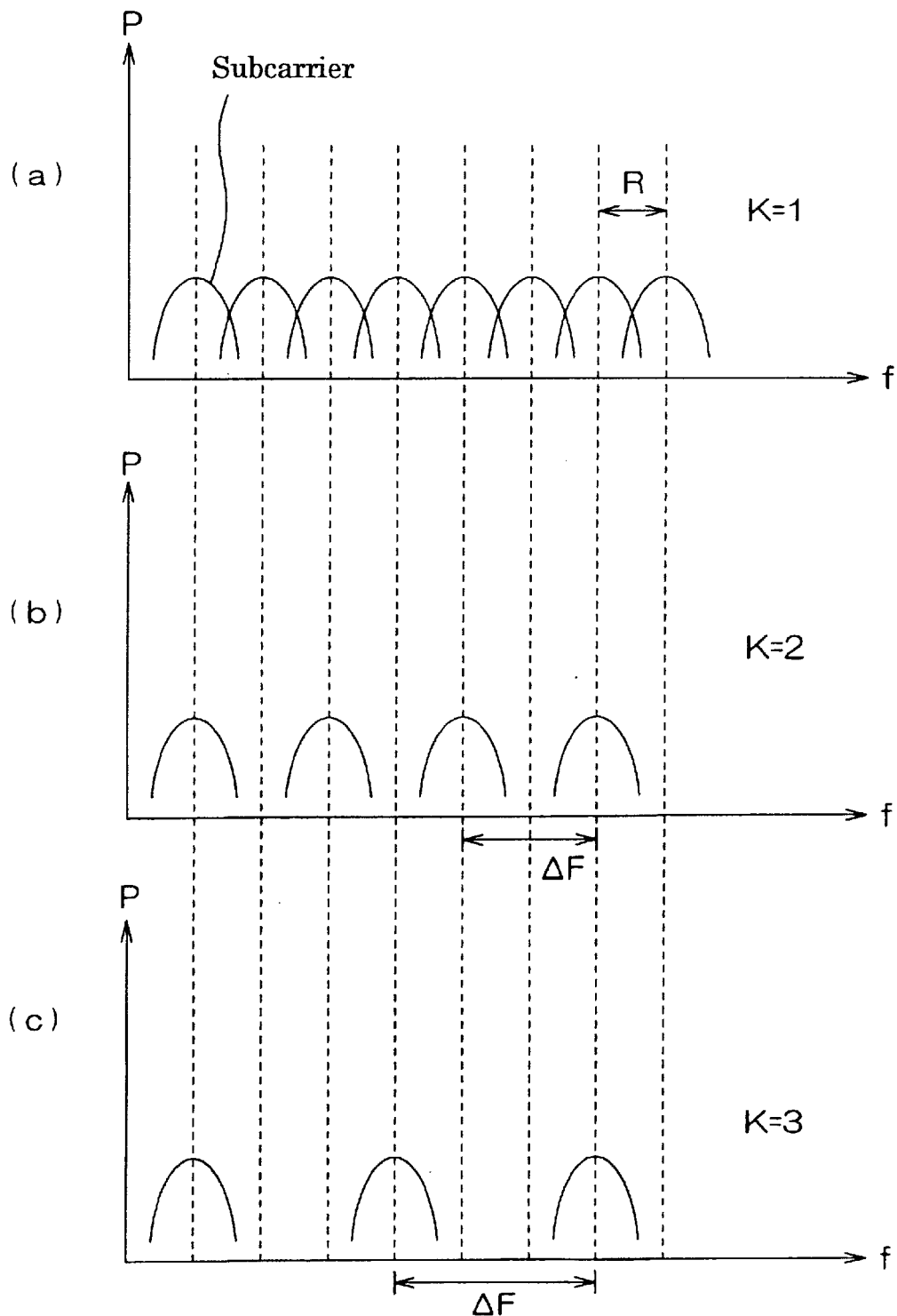
FIGS. 5a–c are graphs showing the arrangement of subcarriers.

FIG. 5 is a graph showing the arrangement of subcarriers according to a value of K, where power is indicated on the ordinate axis and frequency is indicated on the abscissa axis.

FIG. 5(a) corresponds to the case of the carrier arrangement: K=1.

When a vehicle runs at high speed, Doppler shift increases with the movement of a vehicle. Accordingly, assuming carrier arrangement: K=1, carrier interference occurs due to the effects of variation in the frequencies of subcarriers.

Therefore, as shown in FIG. 5(b) and FIG. 5(c), the carrier arrangement K is increased to, for example, 2 or 3 to avoid the effects of the Doppler shift. In this way, the carrier interference does not occur even when a frequency of the subcarrier varies to a certain degree.

The carrier arrangement (K) determination circuit 14 assesses the velocity of a vehicle in the cell based on the data of the deviation Δf of a received frequency. In a case where a plurality of vehicles are present in the cell, the average velocity of the vehicles in the cells is assumed by obtaining data of the deviation Δf of a received frequency from each vehicle and obtaining the average thereof.

Then, the carrier arrangement K is determined based on the velocity of a vehicle or the average velocity of vehicles (hereinafter, referred collectively as "velocity v").

Figure 6:
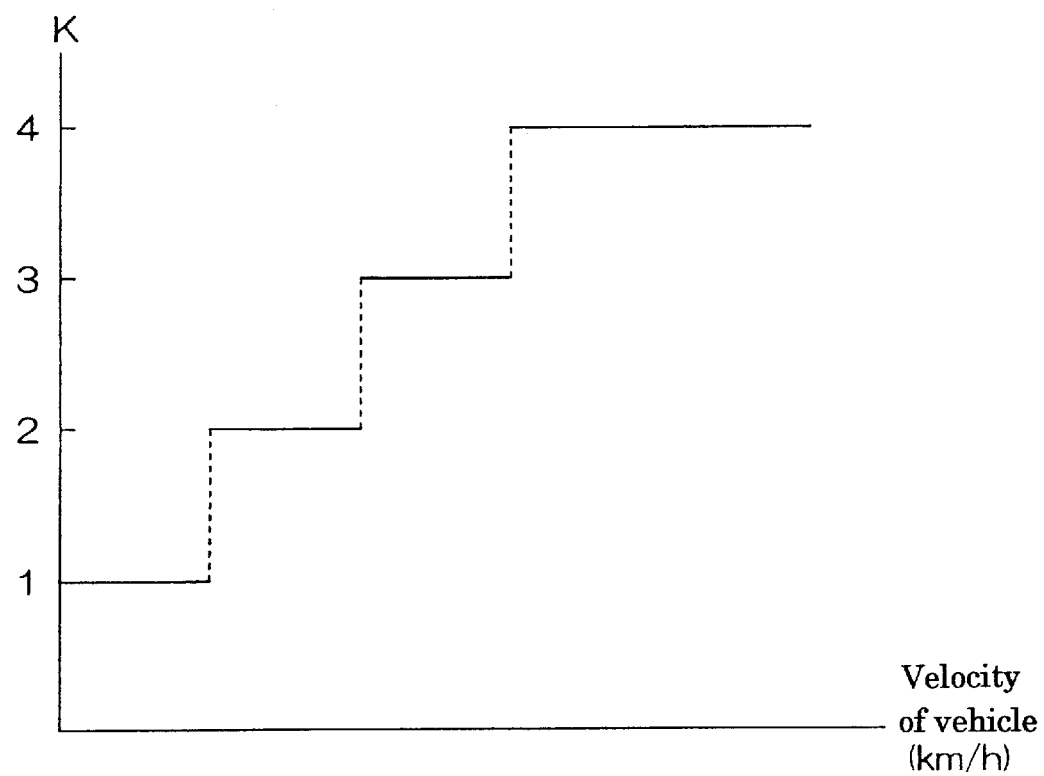
FIG. 6 is a graph exemplarily showing the relationship between the velocity of a vehicle v and the carrier arrangement K.

FIG. 6 is a graph exemplarily showing the relationship between the velocity v and the carrier arrangement K. As can be seen in this graph, the carrier arrangement K is made to increase in a stepwise manner as the velocity v increases. Although K=4 is given as the upper limit in FIG. 6, the upper limit of K is not limited thereto.

Referring again to FIG. 4, the S/P converting circuit 11 converts the transmitted data from a serial signal into a parallel signal.

In this operation, the carrier arrangement (K) determination circuit 14 uses the common subcarrier (i.e., a channel for control. This channel exists irrespectively of the value of K and never becomes a null carrier. In FIGS. 5(a), 5(b), and 5(c), for example, the leftmost subcarriers and the subcarriers at intervals corresponding to the multiples of 6 which are common multiples of K=1, 2, and 3 serve as common subcarriers) and imposes the above-mentioned information of the abovementioned K on the common subcarrier as well as imposing information of a vacant time slot thereon.

To explain in detail, for communication between a road and a vehicle, it is necessary to prevent the collision of data when data is transmitted from a plurality of vehicles toward the road. Therefore, a plurality of time slots allowing data transmission from the vehicles is provided, and the control station 1 transmits to the vehicles information about which time slot is not currently use in, thereby avoiding data collision.

Although it has been described that the subcarrier arrangement is determined based on the carrier arrangement K, the determined subcarrier may be further divided for communication with a plurality of vehicles in the cell.

In this case, the carrier arrangement (K) determination circuit 14 needs to use one subcarrier (channel for control) to impose the above-mentioned information of K as well as to communicate the information about a group of subcarriers which are not used at present.

The data assignment circuit 12 is a switching circuit for assigning parallel data based on the determined carrier arrangement K. The assigned parallel data is converted by the P/S converting circuit 13 into serial data, that is then transmitted to the transmitting and receiving station 2 via the transmission line 9.

The serial data transmitted from the transmitting and receiving station 2 is converted into parallel data by the S/P converting circuit 15. Then, a data selection circuit 16 selects only actual data based on the carrier arrangement K. The P/S converting circuit 17 converts the selected data into serial data to be output.

Next, a configuration of the vehicle-mounted mobile station will be described.

Figure 7:
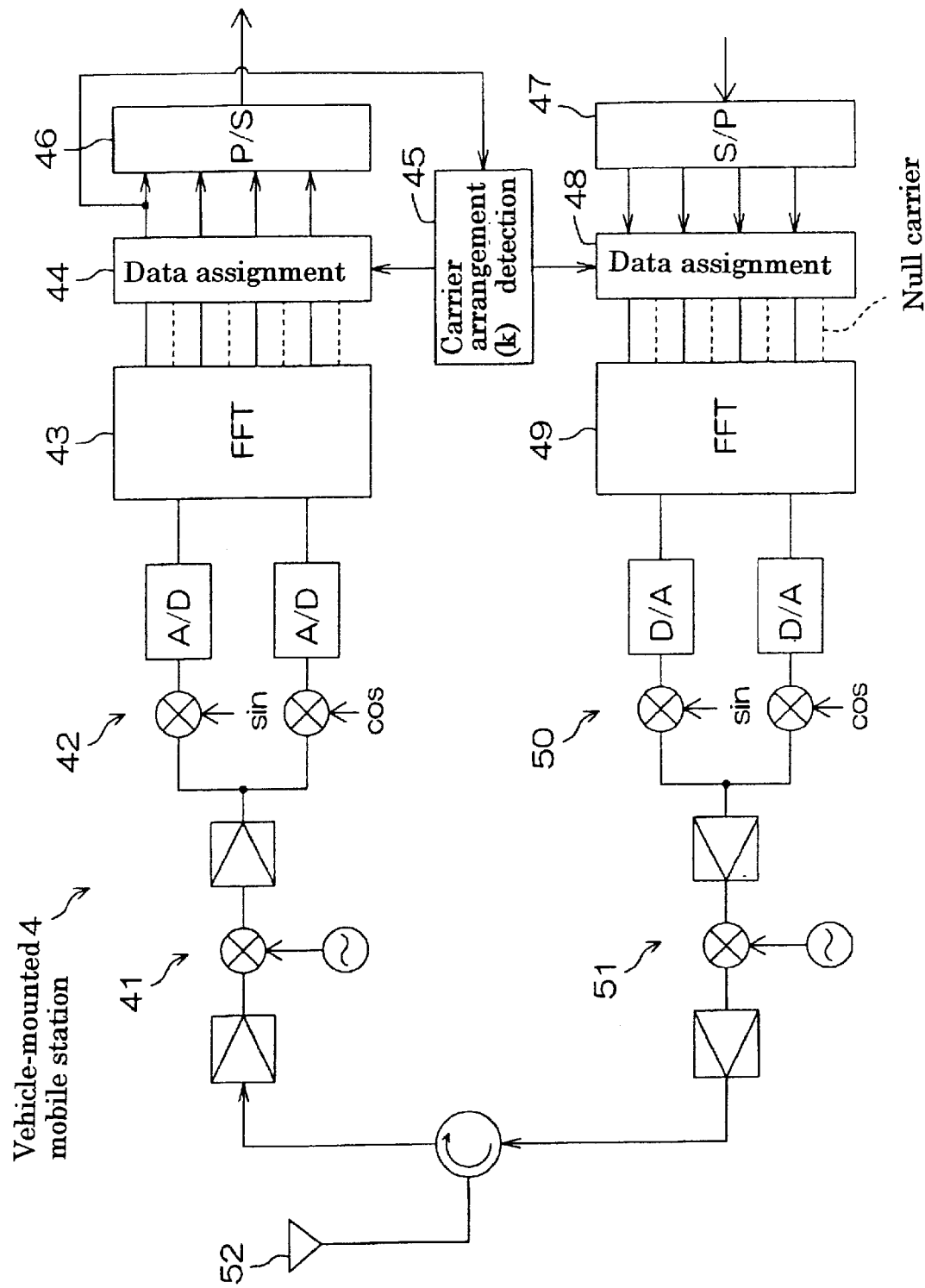
FIG. 7 is a conceptual view showing the internal configuration of a vehicle-mounted mobile station 4.

FIG. 7 is a conceptual view showing the configuration of the vehicle-mounted mobile station 4. The vehicle-mounted mobile station 4 comprises: a receiving section including a down-converter 41, an orthogonal demodulation circuit 42, a Fourier transform circuit 43, a data selection circuit 44, a carrier arrangement circuit 45, a P/S converting circuit 46 and the like: and a transmitting section including an S/P converting circuit 47, a data assignment circuit 48, an inverse Fourier transform circuit 49, an orthogonal modulation circuit 50, an up-converter 51 and the like.

In the above configuration, the description of the components similar to those of FIG. 2 and FIG. 4 is herein omitted, and only components that are different are described below.

The carrier arrangement circuit 45 of the vehicle-mounted mobile station 4 reads out information of the carrier arrangement K contained in the common subcarrier (channel for control) and detects the state of a current subcarrier arrangement. In addition to the information of the carrier arrangement K, the carrier arrangement circuit 45 reads out the information of a vacant time slot and information of a group of vacant subcarriers as described above.

The data selection circuit 44 of the receiving section selects only the data of effective subcarriers based on the detected state of the carrier arrangement.

The data assignment circuit 48 in the transmitting section recognizes the detected state of the carrier arrangement and a disposable vacant time slot or a disposable group of vacant subcarriers and assigns the data to be transmitted to said subcarriers, thereby outputting the data at a predetermined timing.

According to this communication system between a road and a vehicle, the transmitting and receiving section 2 acquires the transmitted data via the wire transmission line 9 from the control station 1 as shown in FIG. 1. Alternatively, any one of the transmitting and receiving stations 2 may serve as a road communication station having the combined functions of the transmitting and receiving stations 2 and the control station 1. In this case, it is necessary to lay the wire transmission line 9 or a wireless transmission line between said road transmission station and the other transmitting and receiving stations 2.

Figure 8:
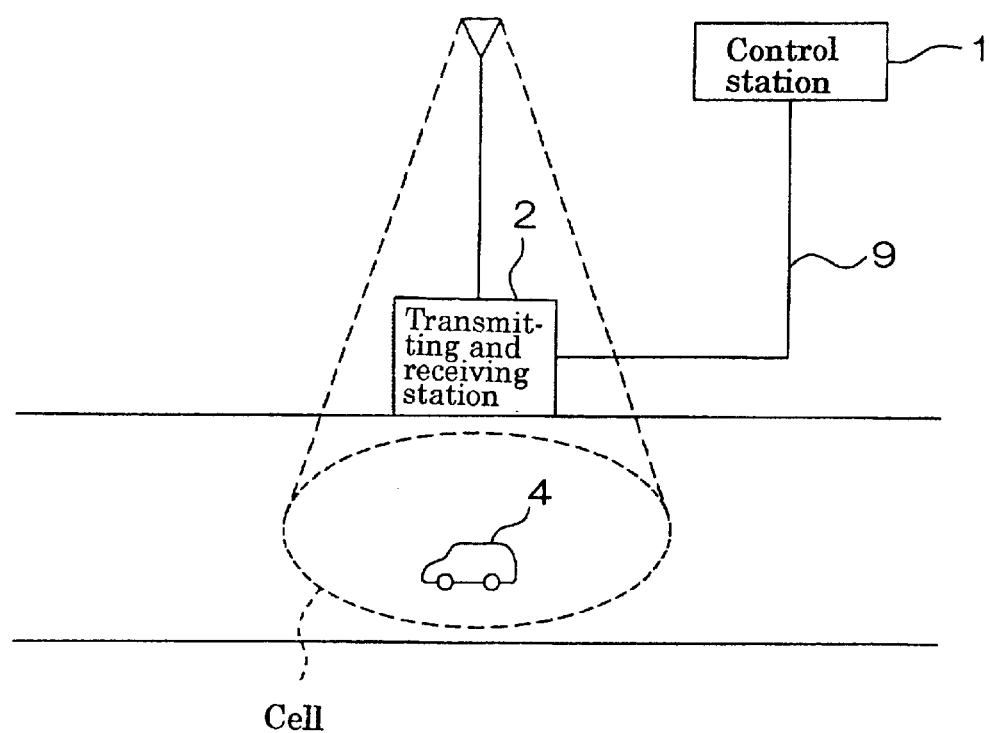
FIG. 8 is a conceptual view showing the configuration of a communication system between a road and a vehicle in a case where the present invention is applied to a single station communication system in which a single transmitting and receiving station 2 is arranged in one cell.

In the embodiment of the present invention as described above, a multi-station communication system, in which a plurality of transmitting and receiving stations 2 are arranged in one cell is conceived. However, the present invention may be carried out with a single-station communication system, as shown in FIG. 8, in which a single transmitting and receiving station 2 is arranged in one cell. In this case, the transmitting and receiving station 2 may also serve as a road communication station having the combined functions of the transmitting and receiving station 2 and the control station 1.

While, the embodiment of the present invention has been described above, the present invention is not limited to the abovementioned embodiment. For example, in order to detect the velocity of a vehicle in a cell, various means such as the transmission of a velocity signal of a vehicle to the road communication station from each of the vehicles, or the provision of an ultrasonic speed detector on the road, or the provision of a television camera on the road, and the like may be used in addition to an assumption based on the deviation of a received frequency.

Various other modifications and changes in design can be made without departing from the scope of the present invention.

What is claimed is:

1. A communication system between a road and a vehicle which performs communication between a road communication station and a vehicle-mounted mobile station in a cell, utilizing an Orthogonal Frequency Division Multiplex (OFDM) modulation method, wherein the velocity of a vehicle in the cell is detected and the space between frequencies of subcarriers of the OFDM is enlarged as the detected velocity of the vehicle becomes higher.

2. A communication system between a road and a vehicle according to claim 1, wherein the velocity of the vehicle in the cell is an average velocity of vehicles in a case where a plurality of vehicles is present in the cell.

3. A road communication station used in a communication system between a road and a vehicle which performs communication between a road communication station and a vehicle-mounted mobile station in a cell, utilizing an Orthogonal Frequency Division Multiplex (OFDM) modulation method, wherein the road communication station comprises a transmitting station, a receiving station, and a control station, and the control station comprises: a carrier arrangement determination means for determining a subcarrier arrangement so as to enlarge the space between frequencies of subcarriers of the OFDM as the detected velocity of the vehicle becomes higher, based on data of the detected velocity of the vehicle in the cell; a data assignment means for assigning data to be transmitted based on the subcarrier arrangement determined by the carrier arrangement determination means; and a data selection means for selecting the received data based on the subcarrier arrangement.

4. A road communication station according to claim 3, wherein information of the subcarrier arrangement determined by the carrier arrangement determination means is transmitted to the vehicle-mounted mobile station in the cell by using a control channel.

5. A road communication station according to claim 3, further comprises a frequency difference detection means for detecting the velocity of the vehicle in the cell based on a shift in the received frequency.

6. A vehicle-mounted mobile station used in a communication system between a road and a vehicle which performs communication between a road communication station and a vehicle-mounted mobile station in a cell, utilizing an Orthogonal Frequency Division Multiplex (OFDW modulation method, comprising:

a subcarrier arrangement information receiving means for receiving from a road communication station, information of a subcarrier arrangement determined so as to enlarge the space between frequencies of subcarriers of the OFDM as the velocity of a vehicle increases in accordance with data of the velocity of the vehicle in the cell;

a data assignment means for assigning data to be transmitted based on the information of the received subcarrier arrangement; and a data selection means for selecting the received data based on the information of the subcarrier arrangement.

* * * * *